(12) United States Patent
Hu et al.

(10) Patent No.: US 9,534,533 B2
(45) Date of Patent: Jan. 3, 2017

(54) CONTROL DEVICE AND METHOD FOR AIR SYSTEM OF DIESEL ENGINE

(75) Inventors: Guangdi Hu, Shandong (CN); Shaojun Sun, Shandong (CN); Dehui Tong, Shandong (CN); Shenggang Guo, Shandong (CN); Yingli Gong, Shandong (CN)

(73) Assignee: Weichai Power Co., Ltd., Weifang (CN)

( * ) Notice: Subject to any disclaimer, the term of this patent is extended or adjusted under 35 U.S.C. 154(b) by 368 days.

(21) Appl. No.: 13/982,243

(22) PCT Filed: Jan. 27, 2011

(86) PCT No.: PCT/CN2011/070690
§ 371 (c)(1),
(2), (4) Date: Jan. 2, 2014

(87) PCT Pub. No.: WO2012/100420
PCT Pub. Date: Aug. 2, 2012

(65) Prior Publication Data
US 2014/0109570 A1    Apr. 24, 2014

(51) Int. Cl.
*F02B 33/44* (2006.01)
*F02B 37/00* (2006.01)
(Continued)

(52) U.S. Cl.
CPC ........... *F02B 37/00* (2013.01); *F02D 41/0007* (2013.01); *F02D 41/0072* (2013.01);
(Continued)

(58) Field of Classification Search
CPC .... F02B 37/00; F02D 41/0072; F02D 41/007; F02D 2041/1409; F02D 2041/1427; Y02T 10/144; Y02T 10/47
(Continued)

(56) References Cited

U.S. PATENT DOCUMENTS 6,247,311 B1   6/2001   Itoyama et al.
6,360,541 B2   3/2002   Waszkiewicz et al.
(Continued)

FOREIGN PATENT DOCUMENTS

CN    1366579 A    8/2002
CN    1466653 A    1/2004
(Continued)

OTHER PUBLICATIONS

PCT International Search Report (with English translation) and Written Opinion, PCT/CN2011/070690, Nov. 3, 2011, 20 Pages.

*Primary Examiner* — Nicholas J Weiss
*Assistant Examiner* — Jason T Newton
(74) *Attorney, Agent, or Firm* — Fenwick & West LLP (57) ABSTRACT

A control device and method for the air system of a diesel engine is disclosed. The feature of the diesel engine is characterized by transfer function. During the control process, a decoupling transfer function is computed according to the transfer function and the steady working parameters of the diesel engine. By the decoupling transfer function acting on the processed state parameters of the air system, driving signals for controlling the exhaust gas recirculation system and the turbocharge system can be individually generated from one another, in order to realize decoupling of them.

20 Claims, 5 Drawing Sheets

(51) Int. Cl.
*F02D 41/00* (2006.01)
*F02D 41/14* (2006.01)

(52) U.S. Cl.
CPC ............... *F02D 2041/1409* (2013.01); *F02D 2041/1427* (2013.01); *Y02T 10/144* (2013.01); *Y02T 10/47* (2013.01)

(58) Field of Classification Search
USPC .......................................... 60/605.2; 701/108
See application file for complete search history.

(56) References Cited

U.S. PATENT DOCUMENTS

| | | | |
|---|---|---|---|
| 6,408,834 B1 * | 6/2002 | Brackney | F02D 41/0007 123/568.21 |
| 6,729,303 B2 | 5/2004 | Itoyama et al. | |
| 7,784,451 B2 * | 8/2010 | Chi | F02D 41/1401 123/568.19 |
| 8,689,539 B2 * | 4/2014 | Lu | F02C 9/54 416/25 |
| 2001/0032466 A1 | 10/2001 | Waszkiewicz et al. | |
| 2002/0103596 A1 * | 8/2002 | Zhu | F02D 41/1401 701/115 |
| 2002/0173898 A1 | 11/2002 | Itoyama et al. | |
| 2010/0170244 A1 * | 7/2010 | Brooks | F02D 21/08 60/602 |
| 2012/0024270 A1 * | 2/2012 | Wang | F02D 41/0007 123/568.21 |
| 2012/0173118 A1 * | 7/2012 | Wang | F02D 41/0002 701/102 |
| 2015/0345412 A1 * | 12/2015 | Conte | F02D 41/0007 701/102 |

FOREIGN PATENT DOCUMENTS

| | | |
|---|---|---|
| JP | 2002-285824 A | 10/2002 |
| JP | 2005-214152 A | 8/2005 |
| JP | 2005-214153 A | 8/2005 |

\* cited by examiner

CONTROL DEVICE AND METHOD FOR AIR SYSTEM OF DIESEL ENGINE

FIELD OF INVENTION

Embodiments of the present invention generally relate to a diesel engine, and more specifically, relate to a control device and method for an air system of a diesel engine.

BACKGROUND OF INVENTION

As the continuous development of engine theory and technology, exhaust gas recirculation (EGR) system has become an important part of a diesel engine. Exhaust gas emitted from a diesel engine generally contains a great amount of nitrogen oxides (NOx), which is a major source for air pollution. With the EGR system, a part of exhaust gas generated by the diesel engine is fed back to cylinders. Since the recirculated exhaust gas is inertial, it will delay the combustion process, decelerate the combustion speed somewhat, further slow down the pressure formation process in the combustion chamber, thereby effectively reducing the nitrogen oxides. Besides, increase of the exhaust gas recirculation ratio will reduce the overall exhaust gas flow, thereby reducing the total pollutants output volume in the exhaust gas emission.

Besides EGR, in order to enhance the power performance of the diesel engine and improve combustion, a turbocharge system is also one of important components in modern diesel engines. For example, a common turbocharge system is a variable geometry turbocharger (VGT). The turbocharging system is essentially an air compression system, in which air intake volume increases in the diesel engine cylinders through compressing air. It is driven by the impact force from the exhaust gas emitted from the engine. The pressure is transmitted to an air compressor through devices such as a turbocharger rotary shaft, such that the newly intake air is effectively boosted before entering into the cylinders.

In a diesel engine equipped with both the EGR and the turbocharge system, the coupling characteristic therebetween poses a challenge to the control of air system. In a diesel engine equipped with both the exhaust gas recirculation system EGR and the turbocharge system, for the EGR system, precise control of the EGR ratio and intake air temperature is crucial to improve NOx emission and reduce its impact on particles, power, and cost-effectiveness. In such an engine, the flow of the exhaust gas input in an EGR cooler is controlled by an EGR valve. Both the inlet end of the EGR valve and the turbo outlet of the turbocharger receive the engine exhaust gas emitted from the exhaust pipes. It is appreciated that besides the opening variation of the EGR valve per se, the change of the boost pressure and exhaust back pressure caused by the turbocharge system will also cause an impact on the EGR flow rate. On the other hand, the opening variation of the EGR valve will also cause an impact on the inlet flow rate of the input booster. In other words, the exhaust gas recirculation system and the turbocharge system are two mutually dependent and mutually influencing systems, i.e., having a coupling characteristic.

The coupling characteristic of the exhaust gas recirculation system and the turbocharge system has always been a challenge for air system control of a diesel engine, and a multi-variable control strategy controlling both has also been a hot issue in studying air system control strategy of the diesel engine. Several known control strategies in prior art are briefly summarized below:

(1) an independent control strategy for exhaust gas recirculation system and turbocharge system, i.e., with the supercharge pressure as control objective, driving the VGT valve by a PID (proportion-integration-differentiation) control with transient feed-forward control strategy so that actual supercharge pressure reaches an objective value; with air flow rate as control objective, driving the EGR valve by PID control with transient feed-forward control strategy so that actual air flow rate reaches an objective value.

(2) With intake air flow and supercharge pressure as control objectives, performing local linearization to average value model of air system, designing an optimal or robust controller based on the linear model, further extending to entire operation scope, thereby obtaining a non-linear control strategy: e.g., H infinity control, a controller design method based on Lyapunov stability theory, minimum quadratic model optimal state feedback control law, sliding mode controller, and the like.

(3) With intake air flow and supercharge pressure as control objectives, a controller design method based on a non-analytic model: e.g., fuzzy logic control method, control method according to neural network, etc.

(4) With intake air flow and supercharge pressure as control objectives, a method of employing model prediction control, i.e., a mathematic model of a controlled object being integrated in the controller, a future output of a multi-step system being predicted through the model, an objective function being built based on the offset between the predicted value and the objective value, and the objective function being minimized by iteratively evaluating the optimal value of current control variables.

(5) With air-fuel ratio and mass fraction of exhaust gas in the intake pipe as control objectives, adopting the air system de-ranking and de-coupling control strategy, i.e., the transmission function matrix of the air system is de-ranking in some cases; thus, the two control objectives have such a relationship that the original two-dimensional control strategy may be converted into a simpler one-dimensional control strategy.

The above mentioned major advantages of the independent PID control strategy (1) based on air flow and supercharge pressure lie in a simpler structure, the capability of implementing a good steady-state control effect, and less experimental workload for parameter calibration. The challenge of the independent closed-loop PID control lies in that the coupling characteristic of the system per se causes unsatisfacting control effect in its dynamic process, and smoking phenomenon likely appears during acceleration process. Another drawback of independently working closed-loop control lies in the limited EGR working scope. Because the EGR valve is only capably of working when the pressure before turbo is higher than the supercharge pressure, it is only applicable to medium-low load and medium-low rotational speed operation. Companies such as Nissan, Toyota, Cummmins do not employ air flow and supercharge pressure as the objective values during practical use, instead, they adopt a control strategy with the EGR rate instead of supercharge pressure as the objective value.

A common problem with the above mentioned methods is EGR flow estimation. Since EGR flow sensor is far away from meeting the requirement of actual use in terms of precision and reliability, the EGR flow is mainly obtained by estimation. However, exhaust pipes temperature and pressure, the EGR pipe throttling coefficient, and cooling efficiency and the like that place an impact on EGR flow all require a considerable amount of testing in order to obtain a satisfactory estimation result. Therefore, the control system according to this method requires enormous work for testing. Although the above mentioned control strategies are able to achieve a sound effect in a steady state control, their transient control effects are always unsatisfying since the exhaust gas recirculation system and the supercharge system simultaneously act on the intake pipe thus having a coupling characteristic, and those control strategies fail to design a transient control strategy for the coupling characteristic.

There is an apparent contradiction between precision requirement and concise requirement of the air system control strategy for control strategies (2)-(4) with intake air flow and supercharge pressure as control objectives. This contradiction is directly caused by the strong coupling and non-linear correlation between the exhaust gas recirculation system and the supercharge system. The independent closed-loop control strategies based on air flow and supercharge pressure, as well as its variations, cannot meet the requirements of steady state and transient performance. Various theoretical study outcomes are not adaptable for the requirements of an actual control system due to various factors such as complexity of control strategies, requirements of control hardware, and difficulties in parameter calibration, etc.

As for the control strategy (5) with the air-fuel ratio and the mass fraction of exhaust gas in the intake pipe as control objectives, due to lack of mature commercial sensor that directly measures the air-fuel ratio and the mass fraction of exhaust gas in the intake pipe during actual use, the feedback control with the parameters as control objectives cannot be realized. However, air flow and supercharge pressure can be very easily measured by existing sensors. Thus, a feedback control strategy based on air flow and supercharge pressure may be built, and air-fuel ration and exhaust gas mass fraction in the intake pipe both as intermediate variables may be obtained through an observer. However, the state observer would introduce time delay and error, which are disadvantageous to transient operation control.

In view of above, the control strategies for air system in a diesel engine in prior art can not well meet the performance requirements of the steady state and transient operation at the same time during actual working of the diesel engine or the requirements of the exhaust and calibrating diesel engine control unit (ECU).

Therefore, it is desirable in this field for an air system control strategy that can satisfy the actual working condition of a diesel engine, and is relatively simple and easily implemented and calibrated.

SUMMARY OF INVENTION

In order to overcome the above mentioned drawbacks existing in prior art, embodiments of the present invention provide an apparatus and method for controlling an air system of a diesel engine in a steady state more effectively.

According to one aspect of the present invention, there is provided an apparatus for controlling an air system of a diesel engine in a steady state, wherein the air system comprises an exhaust gas recirculation system and a turbocharge system, the apparatus comprises: an operation condition acquiring module configured to acquire parameters indicating an actual operation condition of the diesel engine; a decoupling computation module coupled to the operation condition acquiring module and configured to compute a decoupling transfer function based on the parameters from the operation condition acquiring module and a transfer function characterizing the diesel engine; an air system parameter processing module coupled to the operation condition acquiring module and configured to process parameters indicating a state of the air system; and a signal generating module coupled to the decoupling computation module and the air system parameter processing module and configured to generate a first driving signal for the exhaust gas recirculation system and a second driving signal for the turbocharge system based on the decoupling transfer function from the decoupling computation module and the processing result from the air system parameter processing module.

According to another aspect of the present invention, there is provided a diesel engine, comprising: a cylinder body, an intake pipe coupled to an inlet end of the cylinder body and configured to convey gas to the cylinder body, an exhaust pipe coupled to an outlet end of the cylinder body and configured to emit the exhaust gas from combustion in the cylinder body, a fuel ejection system coupled to the cylinder body and configured to eject fuel into the cylinder body, an air system, and a control unit. According to the embodiments of the present invention, the air system comprises: an exhaust gas recirculation system coupled to the exhaust pipe and the intake pipe, and configured to feed part of exhaust gas from the exhaust pipe back to the cylinder body through the intake pipe, and a turbocharge system coupled to the exhaust pipe and configured to supercharge the intake gas pressure of the cylinder using the exhaust gas from the exhaust pipe. The control unit comprises the apparatus as above mentioned for controlling the air system in a steady state.

According to a further aspect of the present invention, there is provided a method for controlling an air system of a diesel engine in a steady state, wherein the air system comprises an exhaust gas recirculation system and a turbocharge system, and the method comprises: acquiring parameters indicating actual operation condition of the diesel engine; computing a decoupling transfer function based on the parameters and a transfer function characterizing the diesel engine; processing parameters indicating a state of the air system; and generating a first driving signal for the exhaust gas recirculation system and a second driving signal for the turbocharge system based on the decoupling transfer function and a result of the processing.

According to the embodiments of the present invention, there is provided an apparatus and method that can effectively control an air system of a diesel engine in a steady state. In the embodiments of the present invention, the diesel engine is characterized by a transfer function. During a control process, a decoupling transfer function is computed based on the transfer function and the parameters indicating the operation condition of the diesel engine. As will be illustrated in detail hereinafter, the decoupling transfer function is one of core ideas of the present invention, for ensuring that a driving signal for an EGR valve and a driving signal for a supercharge valve are generated independently from one another, thereby realizing decoupling between the two. Specifically, decoupling between the two driving signals may be realized by the decoupling function acting on the processed air system state parameters (e.g., the EGR flow ratio of the engine and intake air pressure), which will be detailed hereinafter.

In this way, the embodiments according to the present invention ensure that the exhaust gas recirculation valve and the turbocharge valve are controlled independently in a steady state operation condition and may be calibrated respectively. Therefore, the simplicity of calibrating the two systems is achieved as well as the functionality of the air control system is significantly improved.

BRIEF DESCRIPTION OF SEVERAL VIEWS OF DRAWINGS

Through reading the following detailed description with reference to the accompanying drawings, the above mentioned and other objectives, features, and advantages of the embodiments of the present invention will become easily appreciated. In the drawings, several embodiments of the present invention will be illustrated in an exemplary and non-limiting manner, wherein.

In the drawings, same or corresponding reference signs indicate the same or corresponding parts.

DETAILED DESCRIPTION OF INVENTION

Hereinafter, the principle and spirit of the present invention will be described with reference to various exemplary embodiments. It should be noted that these embodiments are provided only to allow those skilled in the art to better understand and further implement the present invention, instead of limiting the scope of the present invention in any manner.

According to one embodiment of the present invention, there is provided an apparatus and a method for controlling an air system of a diesel engine. It should be noted that the term "air system" used herein at least comprises an exhaust gas recirculation EGR system and a turbocharge system.

It should also be noted that specific turbocharge system such as a variable geometry turbocharge system (VGT) as mentioned herein are only for explanation and illustration purposes. The embodiments of the present invention are likewise suitable for any existing or future developed turbocharge system that works utilizing engine exhaust gas. The scope of the present invention is not limited in this aspect.

Additionally, the term "parameter" used herein represents any value that can indicate a physical quantity of the (objective or actual) physical state or operation condition of the engine. Moreover, in the context of this specification, a "parameter" may be used interchangeably with the physical quantity represented thereby. For example, "a parameter indicating rotary speed" has an equivalent meaning herein with "rotary speed."

Besides, in this specification, the term "acquire" includes various currently existing or future developed means such as measuring, reading, estimating, predicting, and the like.

Hereinafter, the principle and spirit of the present invention will be described in detail with reference to several representative embodiments of the present invention. First, referring to FIG. 1, as mentioned above, FIG. 1 shows a schematic structural diagram of a diesel engine 100 equipped with an exhaust gas recirculation system and a turbocharge system. It should be understood that FIG. 1 only shows those parts of the diesel engine 100 which are relevant to the embodiments of the present invention. The diesel engine 100 may further comprise any number of other components.

Figure 1:
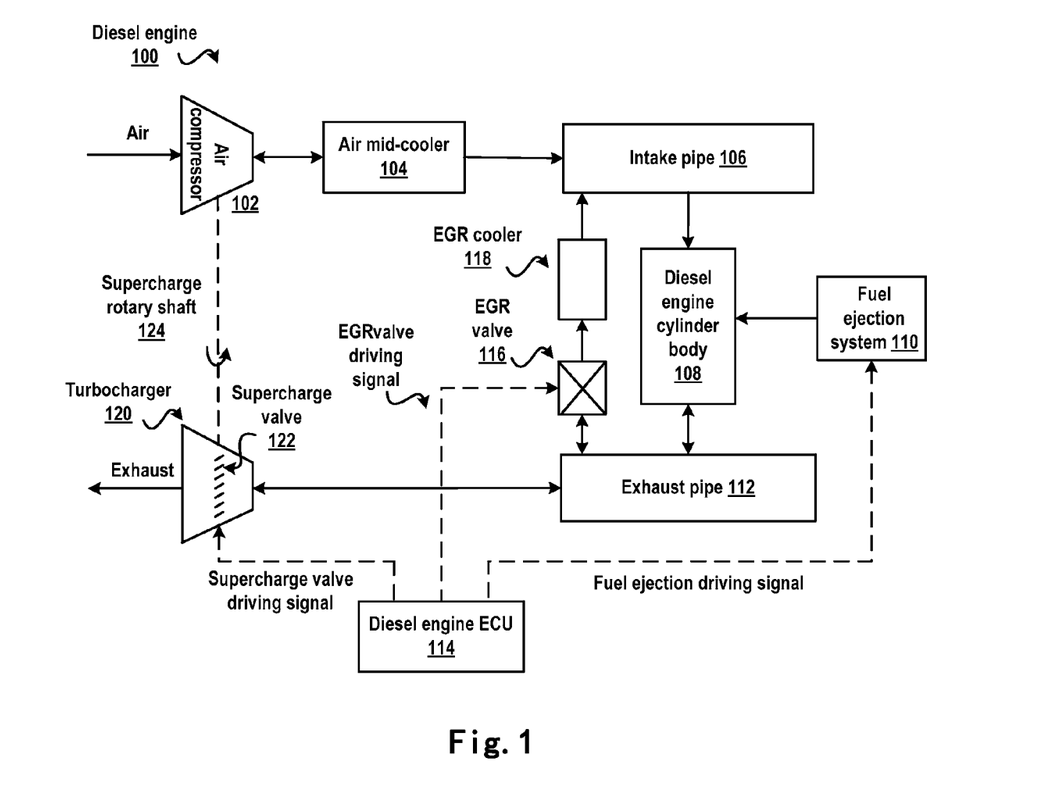
FIG. 1 shows a schematic structural diagram of a diesel engine comprising an exhaust gas recirculation system and a turbocharge system.

As shown in FIG. 1, the diesel engine 100 comprises: a cylinder body 108, an intake pipe 106 coupled to an inlet end of the cylinder body 108 and configured to convey gas to the cylinder body 108, an exhaust pipe 112 coupled to an outlet end of the cylinder body 108 and configured to emit exhaust gas from combustion in the cylinder body 108, a fuel ejection system 110 coupled to the cylinder body 108 and configured to eject fuel into the cylinder body 108, an air system, and a control unit (ECU) 114 for controlling the diesel engine 100. As described above, the air system comprises: an exhaust gas recirculation EGR system (e.g., comprising an ERG valve 116, an ERG cooler 118, and other essential components) coupled to the exhaust pipe 112 and the intake pipe 106, and configured to convey part of exhaust gas from the exhaust pipe 112 back to the cylinder body 108 through the intake pipe 106, and a turbocharge system (e.g., comprising a supercharger 120, a supercharger rotary shaft 124, an air compressor 102, an air mid-cooler 104, and other essential components) coupled to the exhaust pipe 112, and configured to supercharge intake air pressure through the cylinder body 108 using the exhaust gas from the exhaust pipe 112.

As seen in FIG. 1, both the exhaust gas recirculation system and the turbocharge system receive the exhaust gas from the exhaust pipe 112, and their intake air flows are controlled by the EGR valve 116 and the supercharging valve 122, respectively. During the operation, the electronic control unit (ECU) 114 of the diesel engine generates corresponding driving signals based on operation condition of the engine for controlling the opening of the EGR valve 116 and the opening of the supercharge valve 122, respectively. As mentioned above, the performances of the exhaust gas recirculation system and the turbocharge system are mutually influenced by each other, therefore, it is desirable to perform effective control for the opening of the exhaust gas recirculation valve 116 and of the supercharge valve 122.

Figure 2:
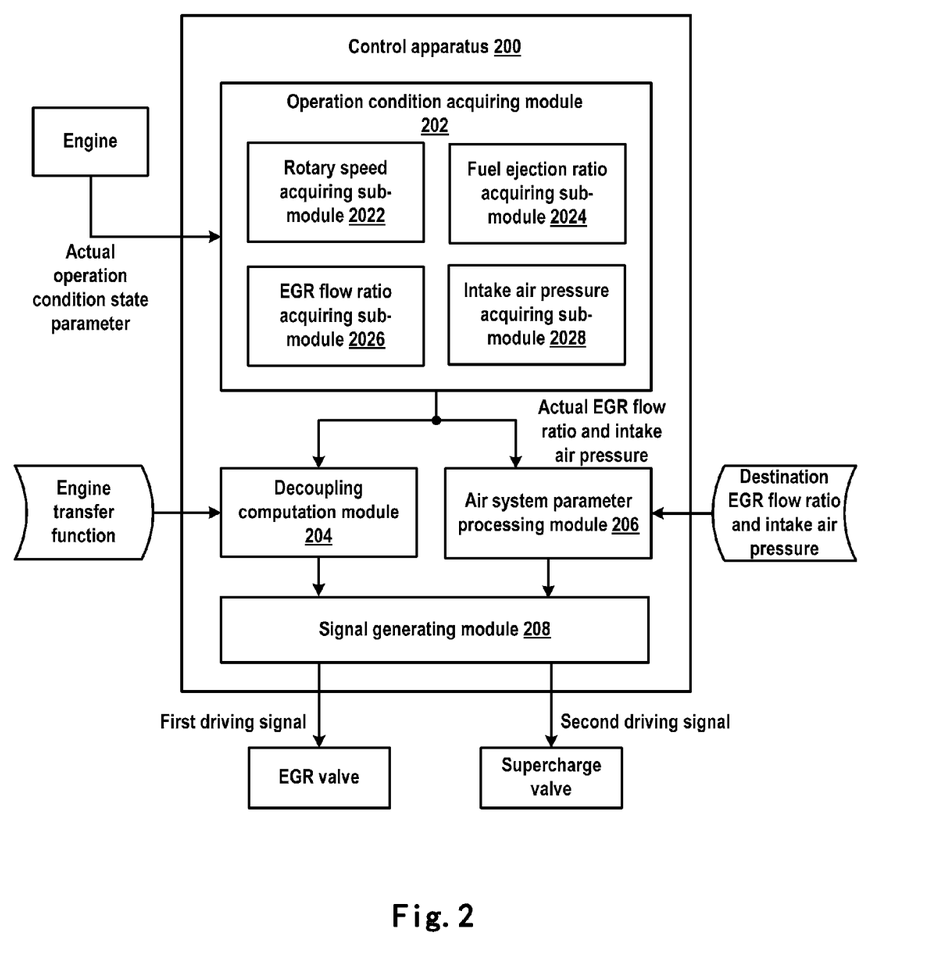
FIG. 2 shows a schematic structural diagram of a control apparatus 200 for controlling an air system of a diesel engine according to one embodiment of the present invention.

Referring to FIG. 2, shown is a schematic structural diagram of a control apparatus 200 for an air system of a diesel engine according to one embodiment of the present invention. It should be understood that the control apparatus 200 may be implemented as the diesel engine ECU 1 as shown in FIG. 1 or a part thereof. Alternatively, the control apparatus 200 may also be implemented as a control device specific for an air system of a diesel engine.

As shown in FIG. 2, the control apparatus 200 comprises an operation condition acquiring module 202 configured to acquire parameters indicating an actual operation condition of a diesel engine (e.g., the diesel engine 100 shown in FIG. 1). In some embodiments of the present invention, the operation condition acquiring module 202 may comprise a rotary speed acquiring sub-module 2022 configured to acquire a parameter indicating an actual rotary speed of the engine, denoted as $\omega$. The operation condition acquiring module 202 may further comprise a fuel ejection ratio acquiring sub-module 2024 configured to acquire a parameter indicating an actual fuel ejection ratio of the engine, denoted as $\dot{m}_f$. Besides, according to one embodiment of the present invention, the operation condition acquiring module 202 further comprises an EGR flow ratio acquiring sub-module 2026 and an intake air pressure acquiring sub-module 2028, which will be described in detail hereinafter.

It should be noted that the operation condition acquiring module 202 (and the sub-modules 2022-2028 included herein) may acquire operation condition parameters through actual measurement. Alternatively or additionally, the operation condition acquiring module 202 may also acquire the operation condition parameters of the engine through estimation or prediction according to actual conditions. The scope of the present invention is not limited in this aspect.

Moreover, it should also be understood that the sub-modules 2022-2028 are only examples of sub-modules that may be included in the operation condition acquiring module 202. In reality, the operation condition acquiring module 202 may comprise any one or more other acquiring sub-modules for acquiring other operation condition parameters of the diesel engine. It would be readily contemplated by those skilled in the art. Likewise, the scope of the present invention is not limited in this aspect.

As shown in FIG. 2, according to one embodiment of the present invention, the control apparatus 200 further comprises a decoupling computation module 204 coupled to the operation condition acquiring module 202 and configured to compute a decoupling transfer function based on parameters (such as engine rotary speed ω and engine fuel ejection ratio $\dot{m}_f$) from the operation condition acquiring module 202, and a transfer function characterizing the engine. Hereinafter, the features and operations of the decoupling computation module 204 will be described in detail with reference to specific examples.

As known in the art, the features of a engine in certain aspects may be characterized by a transfer function. The transfer function may be a polynom of engine state variables, a pulse tracing graph, etc. In particular, as mentioned above, one of main objectives of one embodiment of the present invention is to control the opening of the EGR valve of the exhaust gas recirculation system and the supercharge valve of the turbocharge system, respectively. On the other hand, the opening of the EGR valve and supercharge valve influences the EGR flow ratio (denoted as $\dot{m}_{EGR}$) and intake air pressure (denoted as $P_{im}$) of the diesel engine, which indicate the state of the air system. Therefore, in one embodiment of the present invention, the transfer signal (denoted as W) may be designed to characterize the impact of the opening of the EGR valve and the supercharge valve on the EGR flow ratio ($\dot{m}_{EGR}$) and the intake air pressure ($P_{im}$).

According to some embodiments of the present invention, the transfer function W takes the rotary speed ω and fuel ejection ratio $\dot{m}_f$ of the engine, which are two relatively important engine operation conditions, as independent variables. At this point, the transfer function $W(\omega, \dot{m}_f, s)$ may be defined as below:

$$W(\omega, \dot{m}_f, s) = \begin{bmatrix} W_{11}(\omega, \dot{m}_f, s) & W_{12}(\omega, \dot{m}_f, s) \\ W_{21}(\omega, \dot{m}_f, s) & W_{22}(\omega, \dot{m}_f, s) \end{bmatrix} \quad (1)$$

wherein s denotes the operation state of the engine. Therefore, it is seen from the concept of the transfer function that $$\left\{ \begin{array}{c} \dot{m}_{EGR} \\ P_{im} \end{array} \right\} = \begin{bmatrix} W_{11}(\omega, \dot{m}_f, s) & W_{12}(\omega, \dot{m}_f, s) \\ W_{21}(\omega, \dot{m}_f, s) & W_{22}(\omega, \dot{m}_f, s) \end{bmatrix} \left\{ \begin{array}{c} EGR_{POS} \\ VGT_{POS} \end{array} \right\} \quad (2)$$

wherein $\dot{m}_{EGR}$ denotes the EGR flow ratio of the Engine, $P_{im}$ denotes the intake air pressure of the engine, $EGR_{POS}$ denotes the opening of the EGR valve, and $VGT_{POS}$ denotes the opening of the supercharging valve.

As for the steady state operation condition of the engine, s=0. At this point, the steady state transfer function $W(\omega, \dot{m}_f, 0)$ is:

$$W(\omega, \dot{m}_f, 0) = \begin{bmatrix} W_{11}(\omega, \dot{m}_f, 0) & W_{12}(\omega, \dot{m}_f, 0) \\ W_{21}(\omega, \dot{m}_f, 0) & W_{22}(\omega, \dot{m}_f, 0) \end{bmatrix} \quad (3)$$

According to equations (2) and (3), in the steady state, the relationship of the EGR flow ratio and intake air pressure of the diesel engine with the EGR valve and the supercharge valve may be indicated as:

$$\left\{ \begin{array}{c} \dot{m}_{EGR} \\ P_{im} \end{array} \right\} = \begin{bmatrix} W_{11}(\omega, \dot{m}_f, 0) & W_{12}(\omega, \dot{m}_f, 0) \\ W_{21}(\omega, \dot{m}_f, 0) & W_{22}(\omega, \dot{m}_f, 0) \end{bmatrix} \left\{ \begin{array}{c} EGR_{POS} \\ VGT_{POS} \end{array} \right\} \quad (4)$$

wherein, as known in the art, $W_{11}(\omega, \dot{m}_f, 0)$, $W_{12}(\omega, \dot{m}_f, 0)$, $W_{21}(\omega, \dot{m}_f, 0)$, and $W_{22}(\omega, \dot{m}_f, 0)$ may be calibrated using the data of steady state operation condition of the engine, which will not be detailed herein. Besides, according to one embodiment of the present invention, the transfer function may be pre-determined and stored in a memory device that is accessible by the control apparatus 200.

Below will consider the decoupling transfer function (denoted as G) computed by the decoupling computation module 204. Similar to the transfer function W, the decoupling transfer function G likewise takes the rotary speed ω and the fuel ejection ratio $\dot{m}_f$ of the engine as independent variables and may be defined as below:

$$G(\omega, \dot{m}_f, s) = \begin{bmatrix} G_{11}(\omega, \dot{m}_f, s) & G_{12}(\omega, \dot{m}_f, s) \\ G_{21}(\omega, \dot{m}_f, s) & G_{22}(\omega, \dot{m}_f, s) \end{bmatrix} \quad (5)$$

In the steady state of the engine, the decoupling transfer function $G(\omega, \dot{m}_f, 0)$ is:

$$G(\omega, \dot{m}_f, 0) = \begin{bmatrix} G_{11}(\omega, \dot{m}_f, 0) & G_{12}(\omega, \dot{m}_f, 0) \\ G_{21}(\omega, \dot{m}_f, 0) & G_{22}(\omega, \dot{m}_f, 0) \end{bmatrix} \quad (6)$$

In one preferred embodiment of the present invention, in order to match the actual operation condition of the engine with the theoretic prediction to the utmost extent, suppose that the decoupling computation module 204 may be configured to compute the inverse of the steady state transfer function of the engine as the steady state decoupling function G, namely:

$$G(\omega, \dot{m}_f, 0) = W(\omega, \dot{m}_f, 0)^{-1} \quad (7)$$

Based on equations (3), (6), and (7), it may be derived that:

$$G(\omega, \dot{m}_f, 0) = \begin{bmatrix} G_{11}(\omega, \dot{m}_f, 0) & G_{12}(\omega, \dot{m}_f, 0) \\ G_{21}(\omega, \dot{m}_f, 0) & G_{22}(\omega, \dot{m}_f, 0) \end{bmatrix} \quad (8)$$

$$= \frac{1}{W_{11}(\omega, \dot{m}_f, 0) W_{22}(\omega, \dot{m}_f, 0) - W_{12}(\omega, \dot{m}_f, 0) W_{21}(\omega, \dot{m}_f, 0)}$$

-continued $$\begin{bmatrix} W_{22}(\omega, \dot{m}_f, 0) & -W_{12}(\omega, \dot{m}_f, 0) \\ -W_{21}(\omega, \dot{m}_f, 0) & W_{11}(\omega, \dot{m}_f, 0) \end{bmatrix}$$

Therefore, based on the engine operation condition parameters ($\omega,\dot{m}_f$) acquired by the operation condition acquiring module 202, and based on the transfer functions $W_{11}(\omega,\dot{m}_f,0)$, $W_{12}(\omega,\dot{m}_f,0)$, $W_{21}(\omega,\dot{m}_f,0)$, and $W_{22}(\omega,\dot{m}_f,0)$ which characterize the diesel engine, the decoupling transfer function G may be computed by the decoupling computation module 204. As will be detailed below, driving signals for the ERG system and the turbocharge system may be generated independently, respectively, through the decoupling transfer function G acting on corresponding physical parameters, thereby effectively realizing decoupling control between the two.

It should be understood that the above described are only several exemplary embodiments of the present invention. For example, the features of the engine are not limited to be characterized only by rotary speed and fuel ejection ratio. On the contrary, transfer function W and decoupling transfer function G may include any relevant operation conditions of the engine (i.e., taking them as independent variables). For another example, it is only a preferred embodiment to compute the decoupling transfer function G as the inverse of the engine transfer function W. Those skilled in the art may compute decoupling transfer function G based on transfer function W and operation condition parameters in other manners with reference to actual conditions. The scope of the present invention is not limited in this aspect.

Continue referring to FIG. 2, according to one embodiment of the present invention, the control apparatus 200 may also comprise an air system parameter processing module 206 coupled to the operation condition acquiring module 202 and configured to process parameters indicating the air system of the diesel engine.

In particular, in some embodiments of the present invention, the state parameters of the air system may include: EGR flow ratio and intake air pressure of the diesel engine. Correspondingly, in these embodiments, as mentioned above, the operation condition acquiring module 202 may comprise an EGR flow ratio acquiring sub-module 2026 configured to acquire parameters indicating an actual EGR flow ratio (denoted as $\dot{m}_{egr,act}$) of the engine), and an intake air pressure acquiring sub-module 2028 configured to acquire parameters (denoted as $P_{im,act}$) indicating actual intake air pressure of the engine. The operation condition acquiring module 202 may provide the air system parameter processing module 206 with the acquired actual EGR flow ratio and actual intake air pressure, as shown in FIG. 2.

Besides, as shown in FIG. 2, the air system parameter processing module 206 may be further configured to receive a destination EGR flow ratio (denoted as $\dot{m}_{egr,des}$) and a destination intake air pressure (denoted $P_{im,des}$) of the diesel engine. For example, in some embodiments of the present invention, $\dot{m}_{egr,act}$ and $P_{im,act}$ may be pre-calibrated and pre-stored, such as in a memory device or database accessible by the control device 200.

When the actual values $\dot{m}_{egr,act}$, $P_{im,act}$, and the destination values $\dot{m}_{egr,des}$ and $P_{im,des}$ are given, the air system parameter processing module 206 may be configured to perform essential processing to generating driving signals. For example, according to some embodiments of the present invention, the air system parameter processing module 206 may comprise: a sub-module configured to determine an error (denoted as $e_m$) between the actual EGR flow ratio $\dot{m}_{egr,act}$ and the destination EGR flow ratio $\dot{m}_{egr,des}$. The air system parameter processing module 206 may further comprise: a sub-module configured to determine an error (denoted as $e_P$) between the actual intake air pressure $P_{im,act}$ and the destination intake air pressure $P_{im,des}$. Besides, the air system parameter processing module 206 may further comprise: sub-modules configured to perform PID processing to the error $e_m$ and $e_P$, respectively, and results derived from the processing will be employed by the signal generating module 208 (which will be detailed as below) to generate control signals. The above mentioned sub-modules included in the air system parameter processing module 206 and their operations are known in the art and thus are not shown in the figures, which will not be detailed here either.

It should be understood that the above described EGT flow ratio, intake air pressure, and PID processing are only exemplary. Actually, the air system parameter processing module 206 may be configured to perform any existing or future developed appropriate processing to the state parameters of the air system.

Continue referring to FIG. 2, the control apparatus 200 further comprises a signal generating module 208 coupled to the decoupling computation module 204 and the air system parameter processing module 206, and configured to generate a first driving signal and a second driving signal for the EGR system and the turbocharge system, respectively, based on the decoupling transfer function G from the decoupling computation module 204 and the processing results from the air system parameter processing module 206.

Figure 3:
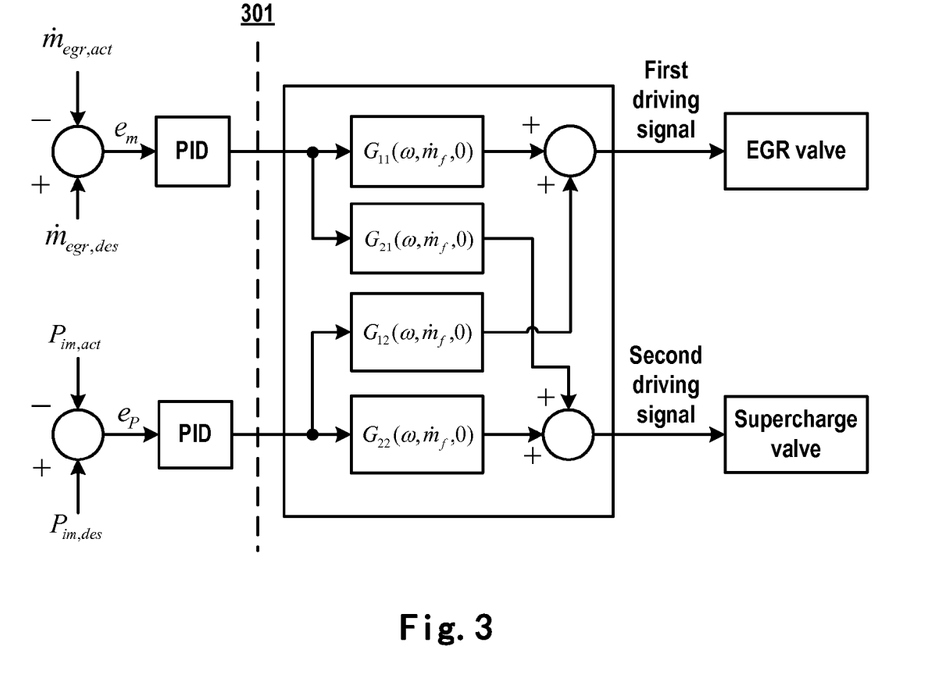
FIG. 3 shows a schematic diagram of generating two kinds of driving signals independently from each other using a decoupling transfer function according to one embodiment of the present invention.

Referring to FIG. 3, shown is a diagram of an exemplary operation mechanism of the signal generating module 208. In the example of FIG. 3, similar with the above described, the transfer function W and the decoupling transfer function G still take the rotary speed and the fuel ejection ratio of the diesel engine as independent variables. Moreover, the state parameters of the air system refer to the EGR flow ratio and the intake air pressure.

In FIG. 3, the part at the left side of the dotted line 301 may indicate the operation of the air system parameter processing module 206, namely, performing essential processing to the actual EGR flow ratio $\dot{m}_{egr,act}$, the destination EGR flow ratio $\dot{m}_{egr,des}$, the actual intake air pressure $P_{im,act}$, and the destination intake air pressure $P_{im,des}$ of the diesel engine. As above mentioned, the processing here may comprise such as determining the EGR flow ratio error $e_m$ and the intake air pressure error $e_P$, and performing PID processing to the $e_m$ and the $e_P$, respectively.

Besides, according to one embodiment of the present invention, the transfer functions $G_{11}(\omega,\dot{m}_f,0)$, $G_{12}(\omega,\dot{m}_f,0)$, $G_{21}(\omega,\dot{m}_f,0)$, and $G_{22}(\omega,\dot{m}_f,0)$ shown in FIG. 3 may be computed by the decoupling computation module 204 and provided to the signal generating module 208, as above described.

As shown in FIG. 3, according to the exemplary embodiments of the present invention, the signal generating module 208 may be configured to have $G_{11}(\omega,\dot{m}_f,0)$ acting on the PID processing output from $e_m$, from which the result is denoted as $G_{11}(\omega,\dot{m}_f,0)\{PID(e_m)\}$, and configured to have $G_{12}(\omega,\dot{m}_f,0)$ acting on the PID processing output from $e_P$, from which the result is denoted as $G_{12}(\omega,\dot{m}_f,0)\{PID(e_P)\}$. Then, the signal generating module 208 may be configured to have and $G_{11}(\omega,\dot{m}_f,0)\{PID(e_m)\}$ and $G_{12}(\omega,\dot{m}_f,0)\{PID(e_P)\}$ jointly acting to generate the first driving signal to control the opening of the EGR valve.

Likewise, the signal generating module 208 may be configured to have $G_{21}(\omega,\dot{m}_f,0)$ acting on the PID processing output of $e_m$, from which the result is denoted as $G_{21}(\omega,\dot{m}_f,0)\{PID(e_m)\}$, and configured to have $G_{22}(\omega,\dot{m}_f,0)$ acting on the PID processing output from $e_P$, from which the result is denoted as $G_{22}(\omega,\dot{m}_f,0)\{PID(e_P)\}$. The signal generating module 208 may be configured to have $G_{21}(\omega,\dot{m}_f,0)\{PID(e_m)\}$ and $G_{22}(\omega,\dot{m}_f,0)\{PID(e_P)\}$ jointly acting to generate the second driving signal to control the opening of the supercharge valve.

It may be understood that FIG. 3 only shows an exemplary operation mechanism of the signal generating module 208. In other embodiments, the signal generating module 208 may be configured to have the decoupling transfer function G acting on relevant parameters such as EGR flow ratio and the intake air pressure in different manners, thereby generating driving signals in a decoupling manner.

The structure and operation of the control apparatus 200 according to the present invention have been described with several detailed embodiments.

It should be understood through the above depiction that according to the embodiments of the present invention, the control apparatus 200 may generate driving signals for the EGR valve and the supercharge valve in an independent manner, respectively, so as to effectively decouple the exhaust gas recirculation system and the turbocharge system in a steady state, thereby improving the control of the air system of the diesel engine.

It should be understood that the control apparatus 200 as illustrated in FIG. 2 and described above may be implemented in various manners. For example, in some embodiments, the apparatus 200 may be implemented as an integrated circuit (IC) chip. In other embodiments, the apparatus 200 may be implemented through a system on chip (SoC) and corresponding software and/or firmware. Alternatively or additionally, the apparatus 200 may also be implemented by software module, i.e., implemented as a computer program product. The scope of the present invention is not limited in this aspect.

Figure 4:
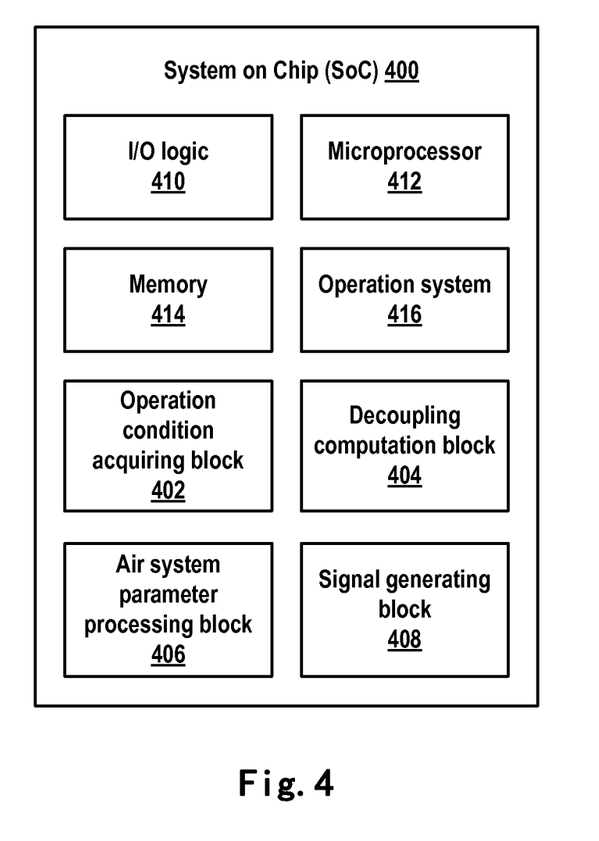
FIG. 4 shows a schematic structural diagram of a system-on-chip (SoC) 400 suitable for implementing a control apparatus 200 in FIG. 2.

Referring to FIG. 4, illustrated is a structural block diagram of a system on chip (SoC) 400 suitable for implementing the control apparatus 200 shown in FIG. 2. As shown in FIG. 4, the SoC 400 comprises various components, such as an input/output (I/O) logic 410 (e.g., for including an electronic circuit) and a microprocessor 412 (e.g., any micro controller or digital signal processor). SoC 400 further comprises a memory 414, which may be any type of random access memory (RAM), a low delay non-volatile memory (e.g., flash memory), a read-only memory (ROM), and/or any other appropriate electronic data storage. The SoC 400 may further comprise various kinds of firmware and/or software, such as an operation system 416, which may be computer-executable instructions maintained by the memory 414 and executed by the microprocessor 412. The SoC 400 may further comprise various kinds of other communication interfaces and components, network interface components, other hardware, firmware, and/or software.

In particular, as shown in the figure, the SoC 400 may comprise an operation condition acquiring block 402, a decoupling computation block 404, an air system parameter processing block 406, and a signal generating block 408, corresponding to the operation condition acquiring module 202, the decoupling computation module 204, the air system parameter processing module 206, and the signal generating module 208, respectively. Besides, although not shown in FIG. 4, according to one embodiment of the present invention, the operation condition acquiring block 402 may comprise sub-blocks corresponding to sub-modules 2022-2028 in FIG. 2, respectively. These blocks 402-408 and their sub-blocks may operate as hardware, software and/or firmware modules independently or integrated with other entities such as a signal processing and control circuit, for implementing various embodiments and/or features as described here.

It should be understood that according to the embodiments of the present invention, the SoC 400 may be integrated with an electronic circuit, a microprocessor, a memory, an input/output (I/O) logic, a communication interface and component, other hardware, firmware, and/or software which are essential for running the whole apparatus. The SoC 400 may further comprise an integrated data bus (not shown) coupled to various components of the SoC so as to be used for data communication between components. The apparatus including SoC 400 may be implemented using multiple combinations of different components.

Figure 5:
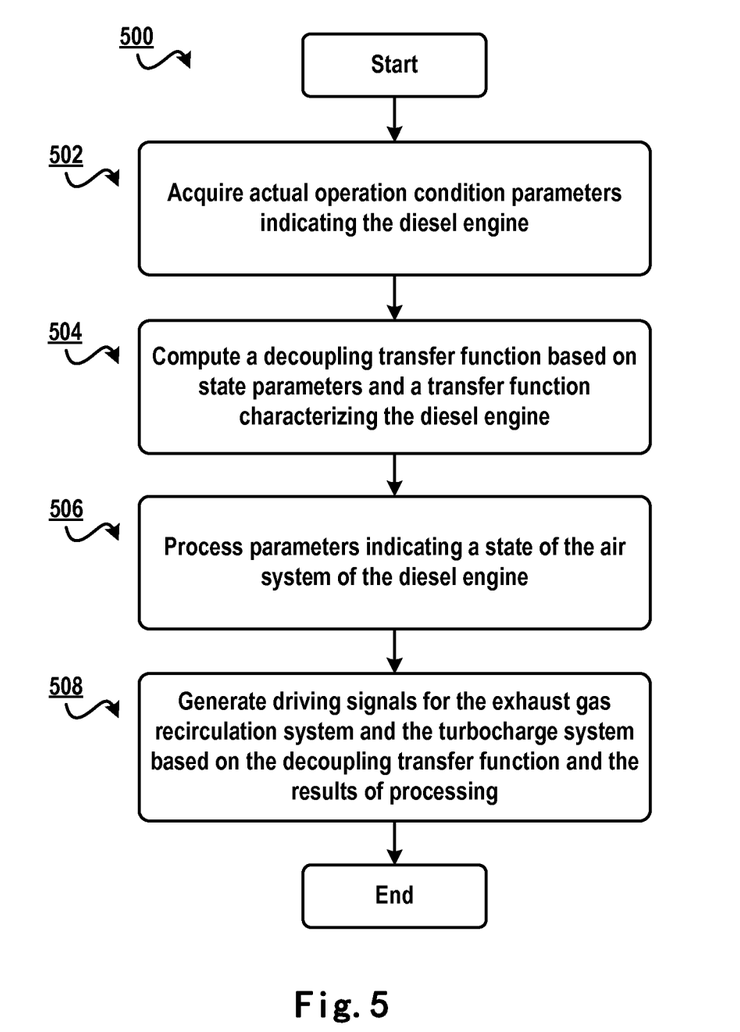
FIG. 5 shows a flow chart of a control method 500 for controlling an air system of a diesel engine according to one embodiment of the present invention.

Now, referring to FIG. 5, shown is a flow chart of a control method 500 for controlling an air system of a diesel engine according to the embodiments of the present invention. After the method 500 starts, parameters indicating actual operation conditions of a diesel engine are acquired, at step 502. The parameters include, but not limited to, rotary speed and fuel ejection ratio of the diesel engine.

Next, at step 504, a decoupling transfer function (e.g., the above described decoupling transfer function G) is computed based on the parameters acquired in step 502 and a transfer function characterizing the diesel engine (e.g., the above described transfer function W).

Then, at step 506, parameters indicating the state of the air system of the diesel engine are processed. According to some embodiments of the present invention, the state parameters of the air system comprise EGR flow ratio and intake air pressure of the diesel engine. In such embodiments, as described above, the errors between the actual values and the destination values of the EGR flow ratio and the intake air pressure are determined, respectively, and PID processing is performed to the errors for later use. Certainly, other air system state parameters and their processing are also possible, and the present invention is not limited in this aspect.

At last, at step 508, a first driving signal for the EGR system and a second driving signal for the turbocharge system are generated, respectively, based on the decoupling transfer function from step 504 and the processing results from step 506. The method 500 ends accordingly.

It may be understood that steps 502-508 as recited in method 500 correspond to the operations and/or functions of modules 202-208 in the control apparatus 200 as described above with reference to FIG. 2. Therefore, the features as described above with reference to respective modules of the control apparatus 200 are likewise suitable for the respective steps of the method 500. Moreover, respective steps as recited in method 500 may be implemented in different orders and/or in parallel.

Further, it should be understood that the method 500 as described with reference to FIG. 5 may be implemented via a computer program product. For example, the computer program product may comprise at least one computer-readable memory medium which has a computer-readable program code portion stored thereon. When it is executed, such as, by a processor, the computer-readable code portion is used to execute the steps of the method 500.

The spirit and principle of the present invention have been illustrated above with reference to several specific embodiments. According to one embodiment of the present invention, there is provided an apparatus and method that can effectively control an air system of a diesel engine in a steady state. During the control process, a decoupling transfer function is computed based on the transfer function of the engine and the parameters indicating the operation condition of the diesel engine. Driving signals for the exhaust gas recirculation (EGR) system and the turbocharge system may be generated independently from each other through the processing results of relevant parameters of the EGR flow ratio and the intake air pressure of the engine on which the decoupling transfer function have acted. In this way, the embodiments according to the present invention ensure that the exhaust gas recirculation valve and the turbocharge valve are controlled independently in a steady state operation condition and may be calibrated respectively. Therefore, not only the simplicity of calibrating the two systems is achieved, but also the functionality of the air control system is significantly improved.

It should be noted that, the embodiments of the present invention can be implemented in software, hardware, or the combination thereof. The hardware part can be implemented as specific logic. The software part can be stored in a memory and executed by a proper instruction execution system such as a microprocessor or a specific-designed hardware. The ordinary skilled in the art may understand that the above described apparatus and method may be implemented as computer-executable instruction and/or in processor control code. For example, such code is provided on a carrier medium such as a magnetic disk, CD, or DVD-ROM, a programmable memory such as a read-only memory (firmware), or a data carrier such as an optical or electronic signal carrier. The apparatus and its modules in the present invention may be implemented as hardware circuitry of a programmable hardware device such as a very large scale integrated circuit or gate array, a semiconductor such as logical chip or transistor, or a programmable hardware device such as a field-programmable gate array, or a programmable logical device, etc., or implemented as software executed by various kinds of processors, or as a combination of the above described hardware circuitry and software, such as firmware.

It should be noted that although several modules or sub-modules of the control apparatus have been mentioned in the above detailed depiction, such partitioning is only non-compulsory. In fact, according to the embodiments of the present invention, the features and functions of two or more modules described above may be embodied in one means, whereas, the features and functions of one module described above may be further embodied in more modules.

Besides, although operations of the present methods are described in a particular order in the drawings, it does not require or imply that these operations must be performed according to this particular sequence, or a desired outcome can only be achieved by performing all operations shown. On the contrary, the execution order for the steps as described in the flow charts may be varied. Additionally or alternatively, some steps may be omitted, a plurality of steps may be merged into one step, and/or a step may be divided into a plurality of steps for execution.

Although the present invention has been described with reference to a plurality of embodiments, it should be understood that the present invention is not limited to the disclosed embodiments. The present invention intends to cover various modifications and equivalent arrangements included in the spirit and scope of the appended claims. The scope of the appended claims meets the broadest explanations and covers all such modifications and equivalent structures and functions.

What is claimed is:

1. An apparatus for controlling an air system of a diesel engine in a steady state, wherein the air system comprises an exhaust gas recirculation system and a turbocharge system, the apparatus comprising:
    an operation condition acquiring module configured to acquire actual operation condition parameters indicating an actual operation condition of the diesel engine;
    a decoupling computation module coupled to the operation condition acquiring module, configured to compute a decoupling transfer function based on the parameters from the operation condition acquiring module and on a transfer function characterizing a relation between outputs (i) an opening of an exhaust gas recirculation valve of the exhaust gas recirculation system and (ii) an opening of a supercharge valve of the turbocharge system, and inputs (a) an exhaust gas recirculation flow ratio and (b) an intake air pressure of the diesel engine;
    an air system parameter processing module coupled to the operation condition acquiring module, configured to process parameters indicating a state of the air system, the state of the air system including the exhaust gas recirculation flow ratio and the intake air pressure of the diesel engine; and
    a signaling generating module coupled to the decoupling computation module and the air system parameter processing module and to the exhaust gas recirculation system and to the turbocharge system, configured to generate and provide a first driving signal to drive the exhaust gas recirculation system and a second driving signal to drive the turbocharge system based on the decoupling transfer function from the decoupling computation module and on the processing performed by the air system parameter processing module.

2. The apparatus according to claim 1, wherein the transfer function takes a rotary speed and a fuel ejection ratio of the diesel engine as independent variables, the operation condition acquiring module further comprising:
    a rotary speed acquiring sub-module configured to acquire a parameter indicating the rotary speed of the diesel engine; and
    a fuel ejection ratio sub-module configured to acquire a parameter indicating a fuel ejection ratio of the diesel engine.

3. The apparatus according to claim 1, wherein the air system parameter processing module is configured to:
    determine an error between an actual exhaust gas recirculation flow ratio and a determined exhaust gas recirculation flow ratio of the diesel engine;
    perform proportion-integration-differentiation (PID) processing to the exhaust gas recirculation flow ratio error;
    determine an error between an actual intake air pressure and a destination intake air pressure of the diesel engine; and
    perform PID processing to the intake air pressure error.

4. The apparatus according to claim 3, wherein the operation condition acquiring module further comprises:
    an exhaust gas recirculation flow ratio acquiring sub-module configured to acquire a parameter indicating an actual exhaust gas recirculation flow ratio of the diesel engine, and provide it to the air system parameter processing module; and
    an intake air pressure acquiring module configured to acquire a parameter indicating an actual intake air pressure of the diesel engine, and provide it to the air system parameter processing module.

5. The apparatus according to claim 1, wherein the decoupling computation module is configured to compute the inverse of the transfer function as the decoupling transfer function.

6. The apparatus according to claim 1, wherein the first driving signal is for controlling an opening of the exhaust gas recirculation valve of the exhaust gas recirculation system, and wherein the second drive signal is for controlling an opening of a supercharge valve of the turbocharge system.

7. The apparatus according to claim 1, wherein the apparatus is implemented using a system-on-chip (SoC) or an integrated circuit (IC).

8. A diesel engine, comprising:
a cylinder body;
an intake pipe coupled to an inlet end of the cylinder body and configured to convey gas to the cylinder body;
an exhaust pipe coupled to an outlet end of the cylinder body, configured to exhaust gas from combustion in the cylinder body;
a fuel ejection system coupled to the cylinder body, configured to eject fuel into the cylinder body;
an air system, comprising:
an exhaust gas recirculation system coupled to the exhaust pipe and the intake pipe, configured to feed part of exhaust gas from the exhaust pipe back to the cylinder body; and
a turbocharge system coupled to the exhaust pipe, configured to increase the intake air pressure of the cylinder body using the exhaust gas from the exhaust pipe; and
a control unit comprising the apparatus according to claim 1, for controlling the air system in a steady state.

9. A method for controlling an air system of a diesel engine in a steady state, wherein the air system comprises an exhaust gas recirculation system and a turbocharge system, the method comprising:
acquiring actual operation condition parameters indicating an actual operation condition of the diesel engine;
computing a decoupling transfer function based on the parameters and on a transfer function characterizing a relation between outputs (i) an opening of an exhaust gas recirculation valve of the exhaust gas recirculation system and (ii) an opening of a supercharge valve of the turbocharge system and inputs (a) an exhaust gas recirculation flow ratio and (b) an intake air pressure of the diesel engine;
processing parameters indicating a state of the air system, the state of the air system including the exhaust gas recirculation flow ratio and the intake air pressure of the diesel engine; and
generating and providing a first driving signal to drive the exhaust gas recirculation system and a second driving signal to drive the turbocharge system based on the decoupling transfer function and on processing parameters.

10. The method according to claim 9, wherein the transfer function takes a rotary speed and a fuel ejection ratio of the diesel engine as independent variables, and the acquiring further comprising:
acquiring a parameter indicating a rotary speed of the diesel engine; and
acquiring a parameter indicating a fuel ejection ratio of the diesel engine.

11. The method according to claim 9, wherein the parameters indicating a state of the air system comprise an exhaust gas recirculation flow ratio and intake air pressure of the diesel engine, and wherein the processing comprises:
determining an error between an actual exhaust gas recirculation flow ratio and a destination exhaust gas recirculation flow ratio of the diesel engine;
performing proportion-integration-differentiation (PID) processing to the exhaust gas flow ratio error;
determining an error between an actual intake air pressure and a destination intake air pressure of the diesel engine; and
performing PID processing to the intake air pressure error.

12. The method according to claim 11, wherein the acquiring further comprises:
acquiring a parameter indicating an actual exhaust gas recirculation flow ratio of the diesel engine; and acquiring a parameter indicating an actual intake air pressure of the diesel engine.

13. The method according to claim 9, wherein computing the decoupling transfer function comprises: computing the inverse of the transfer function as the decoupling transfer function.

14. The method according to claim 9, wherein the first driving signal is for controlling an opening of the exhaust gas recirculation valve of the exhaust gas recirculation system, and wherein the second drive signal is for controlling an opening of a supercharge valve of the turbocharge system.

15. A computer program product, comprising at least one computer-readable memory medium having a computer-readable program code portion stored thereon, when executed by a processor, the computer-readable code portion is used to perform steps of a method for controlling an air system of a diesel engine in a steady state, wherein the air system comprises an exhaust gas recirculation system and a turbocharge system, the method comprising:
acquiring actual operation condition parameters indicating an actual operation condition of the diesel engine;
computing a decoupling transfer function based on the parameters and on a transfer function characterizing a relation between outputs (i) an opening of an exhaust gas recirculation valve of the exhaust gas recirculation system and (ii) an opening of a supercharge valve of the turbocharge system and inputs (a) an exhaust gas recirculation flow ratio and (b) an intake air pressure of the diesel engine;
processing parameters indicating a state of the air system, the state of the air system including the exhaust gas recirculation flow ratio and the intake air pressure of the diesel engine; and
generating and providing a first driving signal to drive the exhaust gas recirculation system and a second driving signal to drive the turbocharge system based on the decoupling transfer function and on processing parameters.

16. The computer program product of claim 15, wherein the transfer function takes a rotary speed and a fuel ejection ratio of the diesel engine as independent variables, and the acquiring further comprising:
acquiring a parameter indicating a rotary speed of the diesel engine; and
acquiring a parameter indicating a fuel ejection ratio of the diesel engine.

17. The computer program product of claim 15, wherein the parameters indicating a state of the air system comprise an exhaust gas recirculation flow ratio and intake air pressure of the diesel engine, and wherein the processing comprises:

determining an error between an actual exhaust gas recirculation flow ratio and a destination exhaust gas recirculation flow ratio of the diesel engine;

performing proportion-integration-differentiation (PID) processing to the exhaust gas flow ratio error;

determining an error between an actual intake air pressure and a destination intake air pressure of the diesel engine; and performing PID processing to the intake air pressure error.

18. The computer program product of claim 17, wherein the acquiring further comprises: acquiring a parameter indicating an actual exhaust gas recirculation flow ratio of the diesel engine; and acquiring a parameter indicating an actual intake air pressure of the diesel engine.

19. The computer program product of claim 15, wherein computing the decoupling transfer function comprises: computing the inverse of the transfer function as the decoupling transfer function.

20. The computer program product of claim 15, wherein the first driving signal is for controlling an opening of the exhaust gas recirculation valve of the exhaust gas recirculation system, and wherein the second drive signal is for controlling an opening of a supercharge valve of the turbocharge system.

* * * * *